(12) United States Patent
Liu et al.

(10) Patent No.: US 11,303,786 B2
(45) Date of Patent: Apr. 12, 2022

(54) IMAGE ACQUISITION APPARATUS BASED ON MINIATURE CAMERA MATRIX

(71) Applicant: BEIJING QINGYING MACHINE VISUAL TECHNOLOGY CO., LTD., Beijing (CN)

(72) Inventors: Zhonghui Liu, Beijing (CN); Yufeng Liu, Beijing (CN); Ting Gong, Beijing (CN); Xing Yin, Jiangsu (CN)

(73) Assignee: BEIJING QINGYING MACHINE VISUAL TECHNOLOGY CO., Beijing (CN)

( * ) Notice: Subject to any disclaimer, the term of this patent is extended or adjusted under 35 U.S.C. 154(b) by 453 days.

(21) Appl. No.: 16/331,761

(22) PCT Filed: Sep. 28, 2016

(86) PCT No.: PCT/CN2016/100546
§ 371 (c)(1),
(2) Date: Mar. 8, 2019

(87) PCT Pub. No.: WO2018/049699
PCT Pub. Date: Mar. 22, 2018

(65) Prior Publication Data
US 2021/0281720 A1    Sep. 9, 2021

(30) Foreign Application Priority Data

Sep. 13, 2016 (CN) .......................... 201610822488.5

(51) Int. Cl.
*H04N 5/225* (2006.01)
*H04N 13/243* (2018.01)
*H04N 13/282* (2018.01)

(52) U.S. Cl.
CPC ......... *H04N 5/2253* (2013.01); *H04N 5/2254* (2013.01); *H04N 13/243* (2018.05); *H04N 13/282* (2018.05)

(58) Field of Classification Search
CPC .. H04N 5/2253; H04N 13/243; H04N 13/282; H04N 5/2254
(Continued)

(56) References Cited

U.S. PATENT DOCUMENTS

2010/0007714 A1* 1/2010 Kim ................... H04N 13/243
                                                              348/36
2011/0102596 A1* 5/2011 Kotani ............... H04N 13/204
                                                             348/159

(Continued)

FOREIGN PATENT DOCUMENTS

| CN | 101900929 A | 12/2010 |
| CN | 103813108 A | 5/2014 |

(Continued)

OTHER PUBLICATIONS

First Chinese Office Action for Application No. 201610822488.5, Including English Translation, 13 pages.

(Continued)

*Primary Examiner* — Joseph G Ustaris
*Assistant Examiner* — Matthew David Kim
(74) *Attorney, Agent, or Firm* — Billion & Armitage

(57) ABSTRACT

An image acquisition apparatus based on a miniature camera matrix, comprising an image generation circuit board and a miniature lens matrix, wherein the image generation circuit board comprises an image generation circuit matrix, various image generation circuits in the image generation circuit matrix all comprise a miniature photosensitive element, and various miniature photosensitive elements constitute a miniature photosensitive element matrix; and various miniature (Continued)

lenses in the miniature lens matrix are fixedly arranged on the image generation circuit board and correspond to the various miniature photosensitive elements on a one-to-one basis, and the axes of the various miniature lenses are respectively perpendicular to a plane where the image generation circuit board is located.

14 Claims, 4 Drawing Sheets

(58) Field of Classification Search
USPC .......................................................... 348/335
See application file for complete search history.

(56) References Cited

U.S. PATENT DOCUMENTS

2013/0258044 A1* 10/2013 Betts-Lacroix ...... H04N 17/002
348/36
2015/0281590 A1* 10/2015 MacMillan .......... H04N 5/2628
348/218.1
2016/0241842 A1* 8/2016 Newbery ............. H04N 13/356

FOREIGN PATENT DOCUMENTS

| CN | 103888751 A | 6/2014 |
| CN | 104836943 A | 8/2015 |
| CN | 205305019 U | 6/2016 |
| CN | 106210489 A | 12/2016 |
| EP | 2733921 A1 | 5/2014 |
| WO | 2018049699 A1 | 3/2018 |

OTHER PUBLICATIONS

International Search Report and Written Opinion for Application No. PCT/CN2016/100546, dated May 31, 2017, 11 pages.
Notification to Grant Patent Right for Invention of Priority Document for CN2016108224885.
Supplementary search of Priority document of CN2016108224885.

* cited by examiner

IMAGE ACQUISITION APPARATUS BASED ON MINIATURE CAMERA MATRIX

CROSS-REFERENCE TO RELATED APPLICATIONS

This application is a National Stage Application of PCT/CN2016/100546, filed on Sep. 28, 2016, which claims benefit of Application No. CN201610822488.5 filed on Sep. 13, 2016 in China and which applications are incorporated herein by reference. A claim of priority to all, to the extent appropriate, is made.

TECHNICAL FIELD

The present disclosure relates to the technical field of optical electronic products and particularly to an image acquisition apparatus based on a miniature camera matrix.

BACKGROUND ART

In order to obtain a three-dimensional image of an object to be photographed by way of image shooting, the following method is provided in the related art. Four digital cameras having the very same model and lenses are provided in a shoot scene in a 2×3 matrix. The four digital cameras photograph the object to be photographed in the shoot scene to give a plurality of pictures, conduct image processing and operation to the plurality of pictures as obtained and thus give a three-dimensional image of the photographed object.

In three-dimensional operation, the fact that the cameras are provided in a planar matrix greatly reduces the three-dimensional operation load and improves the accuracy of the three-dimensional operation. However, such method needs to align cameras in horizontal rows along a parallel direction and align cameras in vertical columns along a vertical direction. That is, it is required that the cameras should form a rectangular structure with accurate geometric dimensions. In addition, it is required that the photosensitive elements of the cameras should be kept in the same horizontal plane. The higher the geometric accuracy of the matrix camera structure is, the higher its corresponding measurement precision and accuracy are.

Currently, one may mount four existing digital cameras on a fixed mechanical structure, and satisfy the requirement of geometric precision of the camera matrix structure as described above by precisely positioning the cameras. But such method has the following problems.

1. In the above related art, a camera matrix formed by four digital cameras is used to photograph an object to be photographed. Since the digital cameras themselves have outer shells, the outer shells have certain dimensions, and the lenses of the four digital cameras are all located in the middle positions of their digital cameras, the distance between the lenses of two adjacent digital cameras is the width of the outer shell of a digital camera as a minimum under extreme condition. As the distance between the lenses of two adjacent digital cameras is the width of the outer shell of a digital camera as a minimum in photographing an object to be photographed in the related art and cannot be further reduced, the mechanism gets large dimensions. In addition, the image shooting method in the related art fails to obtain nearer images by shooting, which results in that the finally obtained three-dimensional image shooting range is limited, and cannot obtain three-dimensional images of near objects.

2. With existing cameras plus a mechanical mounting structure, the mechanical mounting structure itself has errors, and additionally, the cameras do not have the same geometric dimensions in terms of their optical axes, photosensitive surfaces and outer shells due to inconsistent processing and manufacturing. As a consequence, these lead to failure of keeping the photosensitive elements in the same horizontal plane in the end, keeping the optical axes of the photosensitive elements parallel to each other, and further, forming a standard rectangular structure. The above errors can be compensated for to a certain extent by post calibration, but the presence of errors greatly compromises the precision and accuracy of three-dimensional computation.

SUMMARY

In view of this, the purpose of the present disclosure is to provide an image acquisition apparatus based on a miniature camera matrix, wherein a miniature lens and its corresponding miniature photosensitive element and corresponding image generation circuit constitute a miniature camera, and a plurality of miniature cameras constitute a miniature camera matrix. By processing, welding or manufacturing miniature cameras of a matrix structure on a single board and using an integral outer shell, the miniature camera matrix are laid in the same plane, which ensures the geometric precision of the positions of the miniature cameras relative to each other, the parallel relationship of the optical axes of the miniature cameras and the geometric precision of the matrix structure, and may also reduce the distance between adjacent miniature cameras. With the above measures, it is guaranteed that the precision and accuracy of the three-dimensional images are improved, the measurement range is broadened, and the image acquisition apparatus is higher in degree of integration and convenient to process and manufacture, so the apparatus truly is an integrated and miniaturized three-dimensional image capture apparatus.

In a first aspect, an embodiment of the present disclosure provides an image acquisition apparatus based on a miniature camera matrix, which includes an image generation circuit board and a miniature lens matrix.

The image generation circuit board includes an image generation circuit matrix. Each image generation circuit in the image generation circuit matrix includes a miniature photosensitive element. The various miniature photosensitive elements constitute a miniature photosensitive element matrix.

The various miniature lenses in the miniature lens matrix are fixedly provided on the image generation circuit board and correspond to the various miniature photosensitive elements in a one-to-one manner. And the axes of the various miniature lenses each are perpendicular to the plane where the image generation circuit board is located.

In combination with the first aspect, an embodiment of the present disclosure provides a first possible implementation of the first aspect, wherein the various miniature lenses of the miniature lens matrix are disposed in an m×n array, wherein m is greater than or equal to 2, and n is greater than or equal to 2.

In combination with the first possible implementation of the first aspect, an embodiment of the present disclosure provides a second possible implementation of the first aspect, wherein the various miniature lenses in the horizontal direction in the miniature lens matrix are disposed at an equal interval, and adjacent two of the miniature lenses have an interval therebetween greater than or equal to 10 mm.

The various miniature lenses in a vertical direction in the miniature lens matrix are disposed at an equal interval and adjacent two of the miniature lenses have an interval therebetween greater than or equal to 10 mm.

In combination with the first aspect, an embodiment of the present disclosure provides a third possible implementation of the first aspect, wherein the various miniature photosensitive elements in the miniature photosensitive element matrix are formed integrally with the image generation circuit board, or, the various miniature photosensitive elements in the miniature photosensitive element matrix are mounted on the image generation circuit board by welding.

In combination with the third possible implementation of the first aspect, an embodiment of the present disclosure provides a fourth possible implementation of the first aspect, wherein in processing or welding the various miniature photosensitive elements in the miniature photosensitive element matrix, respective pixel rows in the horizontal direction are required to be aligned with each other and respective pixel columns in the vertical direction are required to be aligned with each other.

In combination with the first aspect, an embodiment of the present disclosure provides a fifth possible implementation of the first aspect, wherein the apparatus further includes an image capture circuit board, and the image capture circuit board includes a digital signal processor and a communication module connected in sequence.

The image generation circuits are configured to convert the analog images generated by the miniature photosensitive elements into digital images.

The digital signal processor is configured for the systematic control over the miniature camera matrix, and to fulfill various control functions for image capture, including image capture, image transmission, image gain and shutter control, communication protocol interaction management, timer interruption, task switch, storage management, parameter setting for miniature cameras, capture control and definition of capture format.

The communication module is configured to output a plurality of the digital images to a superior terminal under the control of the digital signal processor.

In combination with the fifth possible implementation of the first aspect, an embodiment of the present disclosure provides a sixth possible implementation of the first aspect, wherein the apparatus further includes a fixing substrate and a front shell.

The image generation circuit board is fixed on the fixing substrate, and the fixing substrate is mounted at an inner surface of the front shell.

The front shell is provided therein with a plurality of lens holes which correspond to the various miniature lenses in a one-to-one manner, and the various miniature lenses carry out shooting through the various lens holes.

In combination with the sixth possible implementation of the first aspect, an embodiment of the present disclosure provides a seventh possible implementation of the first aspect, wherein the apparatus further includes a rear shell and the image capture circuit board is fixedly mounted at the face of the rear shell that faces the front shell.

In combination with the seventh possible implementation of the first aspect, an embodiment of the present disclosure provides an eighth possible implementation of the first aspect, wherein the front shell and the rear shell are fixedly connected to form a housing, and the housing is provided therein with a power input port and a data communication interface.

The power input port is configured to connect a power line, so as to supply power to the image generation circuit board and the image capture circuit board via the power line.

The data communication interface is configured to connect a data line, and the communication module outputs a plurality of the digital images to a superior terminal via the data line.

In combination with the above implementations of the first aspect, an embodiment of the present disclosure provides a ninth possible implementation of the first aspect, wherein the apparatus further includes a lens protection cover, and the lens protection cover is configured to protect the various miniature lenses in the miniature lens matrix.

In the embodiments of the present disclosure, a miniature lens and its corresponding miniature photosensitive element and corresponding image generation circuit constitute a miniature camera. A plurality of miniature cameras constitute a miniature camera matrix. The axes of the various miniature cameras each are perpendicular to the plane where the image generation circuit board is located. Compared with the related art, in the embodiments of the present disclosure, by processing, welding or manufacturing miniature cameras of a matrix structure on a single board, the miniature camera matrix is laid in the same plane, which ensures the geometric precision of the positions of the miniature cameras relative to each other, the parallel relationship of the optical axes of the miniature cameras and the geometric precision of the matrix structure, and may also reduce the distance between adjacent miniature cameras. With the above measures, it is guaranteed that the precision and accuracy of the three-dimensional images are improved, the measurement range is broadened, and the image acquisition apparatus is higher in degree of integration and convenient to process and manufacture, so the apparatus truly is an integrated and miniaturized three-dimensional image capture apparatus.

To make the above object, features and advantages of the present disclosure more apparent and understandable, preferred embodiments are provided and detailed below with reference to the accompanied drawings.

BRIEF DESCRIPTION OF DRAWINGS

In order to more clearly illustrate the technical solutions provided in the embodiments of the present disclosure, drawings necessary for the embodiments will be briefly described below. It should be understood that the following drawings merely show some embodiments of the present disclosure and thus should not be construed as limiting the scope. Other related drawings can be obtained by those ordinarily skilled in the art according to these drawings without paying any creative effort.

REFERENCE SIGNS

Figure 1:
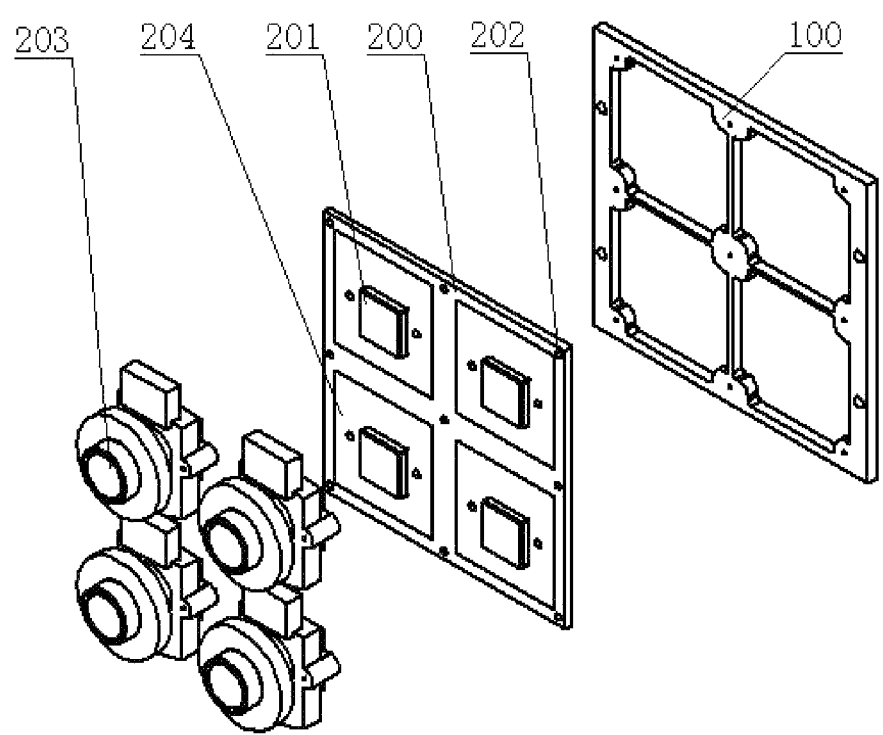
FIG. 1 illustrates a structural schematic view of an image acquisition apparatus provided by an embodiment of the present disclosure.

Fixing substrate 100;

Image generation circuit board 200, miniature photosensitive element 201, mounting hole 202, miniature lens 203, image generation circuit 204;

Front shell 300, lens hole 301;

Image capture circuit board 400;

Rear shell 500;

Power input port 601, data communication interface 602.

DETAILED DESCRIPTION OF EMBODIMENTS

In order to make the purposes, technical solutions and advantages of the embodiments of the present disclosure clearer, the technical solutions provided in the embodiments of the present disclosure will be clearly and comprehensively described with reference to the figures for the embodiments of the present disclosure. Apparently, the embodiments described below are merely some, but not all of the embodiments of the present disclosure. Normally, the components of the embodiments of the present disclosure described and illustrated in the figures herein can be arranged and designed in various configurations. Hence, the following detailed description of the embodiments of the present disclosure provided in the figures is not intended to limit the scope of the present disclosure as claimed, but merely shows the selected embodiments of the present disclosure. All the other embodiments obtained by those skilled in the art based on the embodiments provided in the present disclosure without paying creative efforts shall fall within the scope of protection of the present disclosure.

Considering that the image shooting method in the related art fails to shoot images which meet the precision requirement in terms of geometrically positional relationship, which leads to limited precision and accuracy of the finally obtained three-dimensional images, and failure of obtaining more precise three-dimensional images, the present disclosure provides an image acquisition apparatus based on a miniature camera matrix, which will be described in details by the embodiments below.

FIG. 1 illustrates a structural schematic view of an image acquisition apparatus provided by an embodiment of the present disclosure. As shown in FIG. 1, the image acquisition apparatus provided in the embodiment of the present disclosure includes an image generation circuit board 200 and a miniature lens matrix.

The image generation circuit board 200 includes an image generation circuit matrix. Each image generation circuit 204 in the image generation circuit matrix includes a miniature photosensitive element 201. The various miniature photosensitive elements 201 constitute a miniature photosensitive element matrix.

The various miniature lenses 203 in the miniature lens matrix are fixedly provided on the image generation circuit board 200 and correspond to the various miniature photosensitive elements 201 in a one-to-one manner. And the axes of the various miniature lenses 203 each are perpendicular to the plane where the image generation circuit board 200 is located.

In the embodiments of the present disclosure, a miniature lens 203 and its corresponding miniature photosensitive element 201 and corresponding image generation circuit 204 constitute a miniature camera. A plurality of miniature cameras constitute a miniature camera matrix. The axes of the various miniature cameras each are perpendicular to the plane where the image generation circuit board 200 is located. Compared with the related art, in the embodiments of the present disclosure, by processing, welding or manufacturing miniature cameras of a matrix structure on a single board, the miniature camera matrix is laid on the same plane, which accordingly ensures the geometric precision of the positions of the miniature cameras relative to each other, the parallel relationship of the optical axes of the miniature cameras and the geometric precision of the matrix structure, and may also reduce the distance between adjacent miniature cameras. With the above measures, it is guaranteed that the precision and accuracy of the three-dimensional images are improved, the measurement range is broadened, and the image acquisition apparatus is higher in degree of integration and convenient to process and manufacture, so the apparatus truly is an integrated and miniaturized three-dimensional image capture apparatus.

The above miniature photosensitive elements 201 have the very same model and type, the various image generation circuits 204 are exactly the same, and the various miniature lenses 203 have the very same model and type. Thereby, it is guaranteed that the various miniature cameras are exactly the same.

The above miniature lenses 203 transmit the captured optical signals to the miniature photosensitive elements 201. The miniature photosensitive elements 201 serve to convert the optical signals captured by the miniature lenses 203 into electrical signals for subsequent image processing. The miniature photosensitive elements 201 may be CCD (Charge-coupled Device, an image sensor) or CMOS (Complementary Metal Oxide Semiconductor). Of course, they may also be other well-known electrical components which can be applied in an image acquisition process to convert optical signals into electrical signals.

The image generation circuits 204 mainly serve to convert the electrical signals obtained by the miniature photosensitive elements 201 from analog signals to digital signals and form a digital image for readout by the subsequent circuits.

In the embodiments of the present disclosure, preferably the various miniature lenses 203 in the miniature lens matrix are disposed in an m×n array, wherein m is greater than or equal to 2 and n is greater than or equal to 2.

Specifically, the various miniature lenses 203 may be disposed in a 2×2 array, or 2×3 array, or 3×3 array, or 4×5 array, which will not be enumerated one by one here.

In the present embodiment, the various miniature lenses 203 are disposed in an m×n array. This ensures an appropriate framing range, so as to fully photograph the object to be photographed or the scene to be photographed.

It is found by study that the interval among the various miniature lenses 203 has influence on the range of the field of view of shooting. In the present embodiment, preferably the various miniature lenses 203 in the horizontal direction in the miniature lens matrix are disposed at an equal interval and two adjacent miniature lenses 203 have an interval therebetween larger than or equal to 10 mm. Likewise, the various miniature lenses 203 in the vertical direction in the miniature lens matrix are disposed at an equal interval and two adjacent miniature lenses 203 have an interval therebetween larger than or equal to 10 mm.

Disposing the various miniature lenses 203 in the horizontal direction in the miniature lens matrix at an equal interval and disposing the various miniature lenses 203 in the vertical direction in the miniature lens matrix at an equal interval make it easy to conduct post three-dimensional processing and operation for images and make it easy to produce and mount the image generation circuit board 200.

In addition, if the interval is too large among the various miniature lenses 203 in the miniature lens matrix, a plurality of pictures as shot will have a decreased degree of similarity, which results in a not so good precision regarding the finally synthesized three-dimensional images. In view of this, in another preferred embodiment, preferably the various miniature lenses 203 in the horizontal direction in the miniature lens matrix are disposed at an equal interval and two adjacent miniature lenses 203 have an interval therebetween greater than or equal to 10 mm and less than or equal to 120 mm. Likewise, the various miniature lenses 203 in the vertical direction in the miniature lens matrix are disposed at an equal interval and two adjacent miniature lenses 203 have an interval therebetween greater than or equal to 10 mm and less than or equal to 120 mm.

By keeping the interval between two adjacent miniature lenses 203 in the horizontal direction or in the vertical direction greater than or equal to 10 mm and less than or equal to 120 mm, it is possible to avoid decrease in the degree of similarity of pictures which will result in a not so good precision regarding the finally synthesized three-dimensional images, and it is also possible to reduce the dimensions of the image acquisition apparatus so as to make it easy to produce and process the image acquisition apparatus.

It should be noted that on the basis that two adjacent miniature lenses 203 in the horizontal direction or in the vertical direction have an interval therebetween larger than or equal to 10 mm, the upper limit of the interval is not limited to 120 mm, but it can be 150 mm or 180 mm and may be determined as actually required. Generally speaking, the larger the value of the focal length of the miniature lenses 203 is, the larger the range of the field of view for photographing an object is, and the larger the interval between adjacent miniature lenses 203 should be.

To further ensure regular and orderly images shot by the plurality of miniature cameras, preferably the interval between two adjacent miniature lenses 203 in the horizontal direction in the miniature lens matrix is equal to the interval between two adjacent miniature lenses 203 in the vertical direction in the miniature lens matrix.

Those skilled in the art can understand that as the various miniature lenses 203 are disposed in correspondence to the various miniature photosensitive elements 201 and the various image generation circuits 204, the various miniature photosensitive elements 201 and the various image generation circuits 204 are both disposed in the same way as the miniature lenses 203, and thus it will not be repeated here.

In FIG. 1, the various miniature photosensitive elements 201 in the miniature photosensitive element matrix are formed integrally with the image generation circuit board 200. Alternatively, the various miniature photosensitive elements 201 in the miniature photosensitive element matrix are mounted on the image generation circuit board 200 by welding. In this case, in processing or welding the various miniature photosensitive elements 201 in the miniature photosensitive element matrix, respective pixel rows in the horizontal direction are required to be aligned with each other and respective pixel columns in the vertical direction are required to be aligned with each other.

In the related art, there are already various types of independent miniature photosensitive elements 201 which all include CCD and/or CMOS and are highly technologically mature. Miniature photosensitive elements 201 suitable for use may be selected according to the range of the field of view, the measurement precision and the measurement speed, etc., and then a corresponding image generation circuit board 200 may be designed. The image generation circuit board 200 may be a PCB (Printed Circuit Board) and then the various miniature photosensitive elements 201 may be welded on the image generation circuit board 200 according to the layout requirement of the miniature lenses 203 as previously mentioned. If a welding method is used, in order to ensure the welding precision, a special-purpose photosensitive element positioning fixture may be used to ensure the position precision of the various miniature photosensitive elements 201 after welding.

The miniature photosensitive elements 201 are welded on the image generation circuit board 200 by way of welding. Currently, photosensitive elements like CCD and CMOS are generally processed into a rectangle according to the number of rows and columns of pixels. In conducting three-dimensional operation, it is required that the pixel rows at their respective coordinate positions in the same row should be on the same straight line, and additionally, the pixel columns at their respective coordinate positions in the same column should be on the same straight line. Therefore, in the present embodiment, it is required that when the various miniature photosensitive elements 201 form a standard rectangle, the positions where the pixels in the miniature photosensitive element matrix are located (which positions are indicated by the values of rows and columns) should also constitute a rectangular structure accordingly, so as to ensure the accuracy of the three-dimensional operation. Hence, in processing or welding the miniature photosensitive elements 201 on the image generation circuit board 200, respective pixel rows in the horizontal direction are required to be aligned with each other, and respective pixel columns in the vertical direction are required to be aligned with each other, so as to ensure the accuracy of the three-dimensional operation.

As photosensitive elements like CCD and CMOS generally have a pixel interval at micron scale, in welding the miniature photosensitive elements 201, it is very hard to keep their respective pixel rows or columns fully aligned, and it is inevitable that the respective pixel rows or columns will have relative offset or relative rotation. To compensate for the above errors, it is required to measure and calibrate the above processing errors so as to make compensation and correction by software in three-dimensional computation.

Alternatively, the miniature photosensitive elements 201 are integrally formed with the image generation circuit board 200 by way of synchronous processing. As required by the geometric precision of the matrix, to ensure that the various pixel positions in the miniature photosensitive element matrix also form a standard rectangular structure and to improve the precision and speed of three-dimensional operation, we may process the image generation circuit board 200 in a custom way, integrally form the various miniature photosensitive elements 201 and the image generation circuit board 200, and process and finish the various miniature photosensitive elements 201 while processing the image generation circuit board 200, that is, process a large CCD or CMOS formed by a plurality of photosensitive areas constituting a rectangle. By employing such a method, the errors arising from the aforementioned welding method are avoided, the image operation time is reduced, and three-dimensional image data is more accurate. By the integral formation method, it is also required to process the image generation circuits 204 on the image generation circuit board 200 by placing the image generation circuits 204 on another circuit board or placing them on the image capture circuit board 400 or adjusting the circuit layout, so as to process them on those positions where they do not keep the miniature photosensitive elements 201 from integrally forming a matrix.

Figure 2:
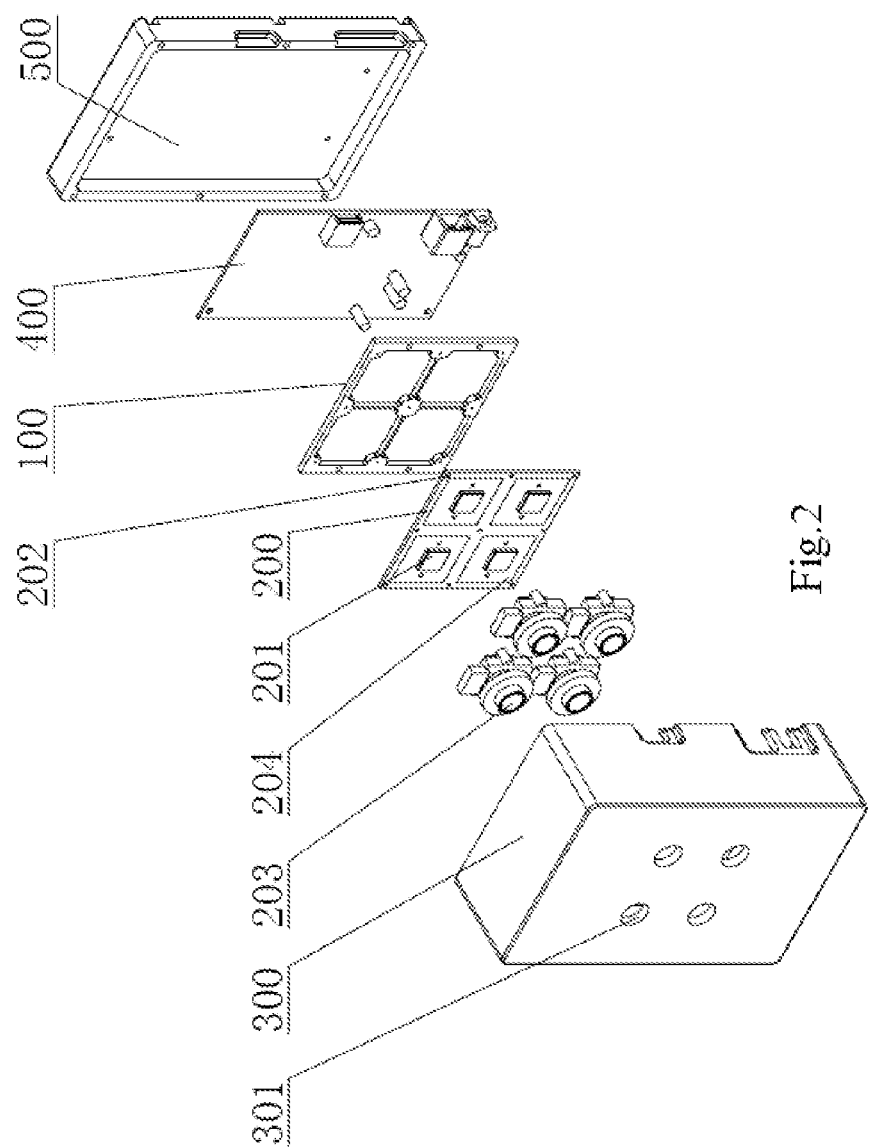
FIG. 2 illustrates an exploded schematic view of an image acquisition apparatus provided by an embodiment of the present disclosure.
Figure 4:
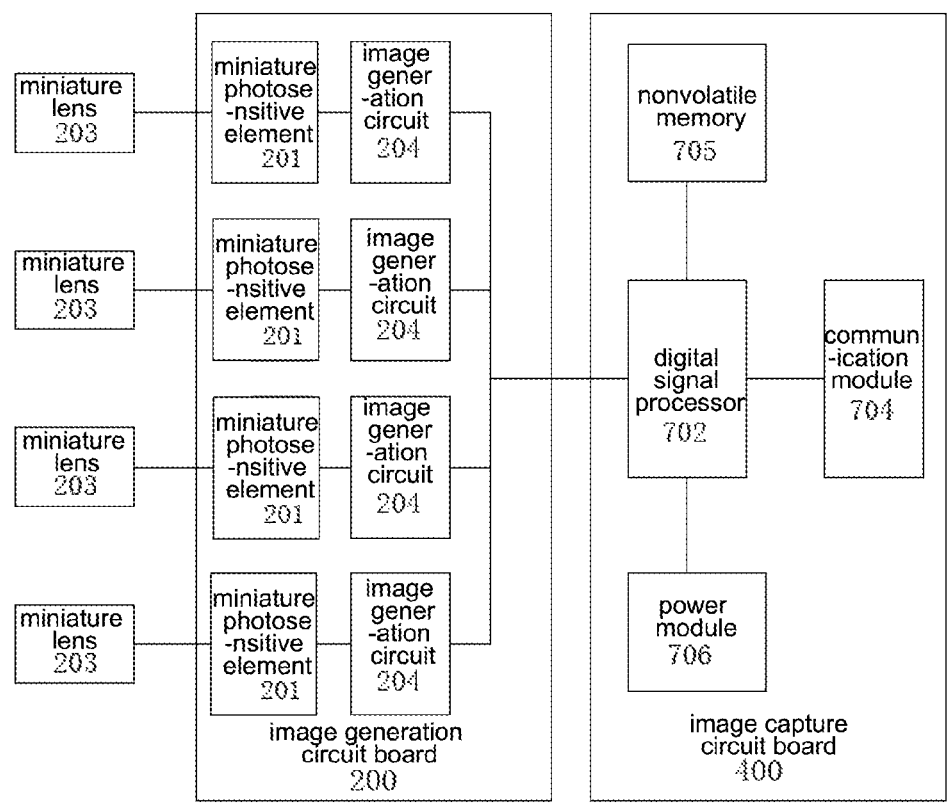
FIG. 4 illustrates a schematic view of the modular composition of an image acquisition apparatus provided by an embodiment of the present disclosure.

FIG. 2 illustrates an exploded schematic view of an image acquisition apparatus provided by an embodiment of the present disclosure. FIG. 4 illustrates a schematic view of the modular composition of an image acquisition apparatus provided by an embodiment of the present disclosure. As shown in FIG. 2 and FIG. 4, the image acquisition apparatus provided by the embodiments of the present disclosure further includes an image capture circuit board 400, and the image capture circuit board 400 includes a digital signal processor 702 and a communication module 704 connected in sequence.

The miniature lenses 203 focus optical signals to the miniature photosensitive elements 201. The miniature photosensitive elements 201 generate analog images according to the optical signals. The image generation circuits 204 convert the analog images generated by the miniature photosensitive elements 201 into digital images and conduct image capture control, gain and shutter control. The image generation circuits 204 also communicate with the digital signal processor 702 in the image capture circuit board 400 and send digital images to the digital signal processor 702. The digital signal processor 702 in the image capture circuit board 400 is configured for systematic control over the miniature camera matrix and to fulfill various control functions for image capture, including image capture, image transmission, image gain and shutter control, communication protocol interaction management, timer interruption, task switch, storage management, parameter setting for miniature cameras, capture control and definition of capture format etc. The digital signal processor 702 is also configured to output the various digital images to a superior terminal via the communication module 704. The communication module 704 is configured to output a plurality of digital images to a superior terminal under the control of the digital signal processor 702.

Specifically, the digital signal processor 702 is something like the CPU (Central Processing Unit) chip on an embedded computer, and it may be DSP (Digital Signal Processing), ARM (Acorn RISC Machine, RISC microprocessor), FPGA (Field Programmable Gate Array) chips etc., which is the control core of the entire image capture system. An identical chip is provided in the image generation circuits 204, except that the digital signal processor in the image generation circuits 204 is only used for image capture and control of a single miniature camera, whereas the digital signal processor 702 is used for overall control over the image capture made by the miniature camera matrix in the present embodiment. When operating, the digital signal processor 702 first calls in an embedded program, communicates with a superior terminal, and communicates with the digital signal processor in the image generation circuits 204 to control the execution of initialization command for the miniature cameras, set parameters for the miniature cameras, e.g. exposure time, trigger method and image gain, send the internal parameters of the miniature cameras to the superior terminal, e.g. serial numbers of the miniature cameras, control the image capture by the various miniature cameras once receiving a shooting command, and transmit the images to the superior terminal after the capture.

It should be noted that electrical connection is enabled between the image generation circuit board 200 and the image capture circuit board 400 via circuit interfaces. During a specific circuit design, some modules of the image generation circuit board 200 e.g. the analog-digital conversion circuit may be moved down to the image capture circuit board 400 as required by the dimensions of the outer shell and the specific condition, or some modules of the image generation circuit board 200 or the image capture circuit board 400 may be made onto another circuit board in order to reduce the area of the circuit boards. The above modifications will not impact the fulfillment of the specific functions of the image acquisition apparatus, but will make it easier to meet the design requirements for package and overall dimensions.

In addition, the superior terminal sends a shooting trigger signal to the communication module 704. The communication module 704 sends the shooting trigger signal to the digital signal processor 702. The digital signal processor 702, according to the shooting trigger signal, controls the miniature photosensitive elements 201 to produce analog image signals according to optical signals, controls the image generation circuits 204 to convert analog images into digital images, and controls the communication module 704 to transmit a plurality of digital images to the superior terminal.

As shown in FIG. 4, the image capture circuit board 400 further includes a nonvolatile memory 705 and a power module 706. The power module 706 is electrically connected with each of the various power consuming components on the image capture circuit board 400 to supply power to the various power consuming components. The nonvolatile memory 705 is connected with the digital signal processor 702 for storing the variables and a plurality of digital images generated by the digital signal processor 702 during image processing.

The above communication module 704 includes a data exchange circuit or device and its respective output and input interfaces. The data exchange circuit or device is like a network switch which may group the images captured by the miniature camera matrix to the same network interface for output, and it may also use a plurality of network interfaces for parallel output, in which case the number of output interfaces should suit with the time required for image capture.

The output and input interfaces of the communication module 704 include a system bus interface, a network device interface and an I/O control interface. The system bus interface, the network device interface and the I/O control interface each are connected with the digital signal processor 702. The network device interface and the I/O control interface each are connected with the power module 706. The system bus interface is configured to send out a plurality of digital images via a system bus. The network device interface is configured to send out a plurality of digital images via a network device. The I/O control interface is configured to receive a shooting trigger signal sent by an external device.

The above system bus interface includes but is not limited to RS-232/485 interface, 1394 interface, USB interface and camerlink interface. The above network device interface includes but is not limited to RJ-45 interface, RJ-11 interface, SC optical fiber interface, FDDI interface, AUI interface, BNC interface and Console interface, and it may also be a wireless network interface, e.g. 3G, 4G or WIFI (WIreless-Fidelity).

As shown in FIG. 1, the image acquisition apparatus in the embodiment of the present disclosure further includes a fixing substrate 100. The image generation circuit board 200 is fixed on the fixing substrate 100. As shown in FIG. 1, the image generation circuit board 200 is provided therein with mounting holes 202. The image generation circuit board 200 is fixed on the fixing substrate 100 via the mounting holes 202. In this case, one can fix the image generation circuit board 200 on the fixing substrate 100 by bolted connection via the mounting holes 202, and can also fix the image generation circuit board 200 on the fixing substrate 100 by riveting or pivoting connection via the mounting holes 202.

As shown in FIG. 2, the image acquisition apparatus in the embodiment of the present disclosure further includes a front shell 300. The front shell 300 is provided therein with a plurality of lens holes 301 which correspond to the various miniature lenses 203 in a one-to-one manner. The fixing substrate 100 is mounted on the inner surface of the front shell 300. The various miniature lenses 203 carry out shooting via the various lens holes 301.

Figure 3:
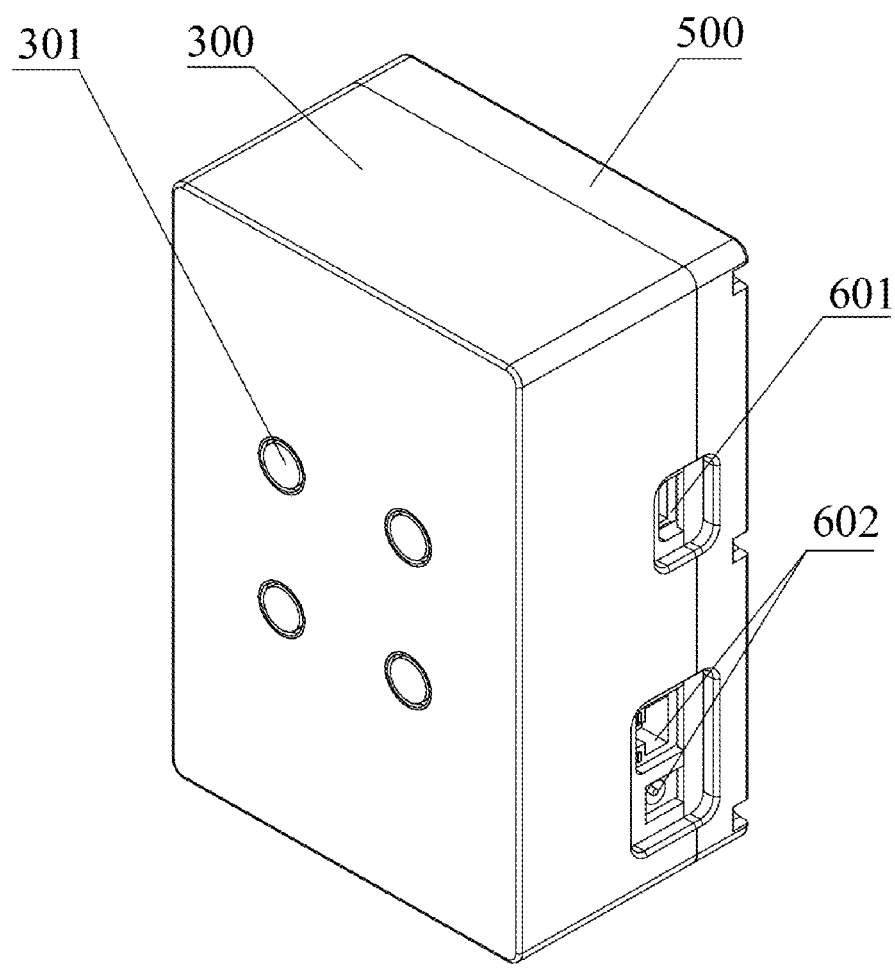
FIG. 3 illustrates an assembled schematic view of an image acquisition apparatus provided by an embodiment of the present disclosure.

FIG. 3 illustrates an assembled schematic view of an image acquisition apparatus provided by an embodiment of the present disclosure. As shown in FIG. 3, the various miniature lenses 203 cooperate with the various lens holes 301 in a way that the miniature lenses 203 may be fixed on one hand, and may carry out shooting via the lens holes 301 on the other hand. The miniature lenses 203 are fixed on the image generation circuit board 200. The image generation circuit board 200 is fixed on the fixing substrate 100. The fixing substrate 100 is mounted on the inner surface of the front shell 300 so as to allow the various miniature lenses 203 to carry out shooting via the various lens holes 301, and also allow the miniature camera matrix constituted by the various miniature cameras to be fixed on the inner surface of the front shell 300.

As shown in FIG. 2 and FIG. 3, the image acquisition apparatus of the embodiments of the present disclosure further includes a rear shell 500. The front shell 300 and the rear shell 500 are fixedly connected to form a housing. The image capture circuit board 400 is fixedly mounted on the face of the rear shell 500 that faces the front shell 300.

Specifically, the fixing substrate 100 is fixedly connected with the front shell 300. The image capture circuit board 400 is fixedly connected with the rear shell 500. The front shell 300 and the rear shell 500 are fixedly connected to form an integral housing. The fixing substrate 100 and the image capture circuit board 400 are located inside the housing.

In this case, the fixing substrate 100 is fixedly connected with the front shell 300 by way of bolts, clamping connection, pivoting connection and riveting connection, etc. The image capture circuit board 400 is fixedly connected with the rear shell 500 by way of bolts, clamping connection, pivoting connection and riveting connection, etc. The front shell 300 and the rear shell 500 can be fixed with each other to form a housing by way of clamping connection and bolted connection, etc.

As shown in FIG. 3, the housing is provided therein with a power input port 601 and a data communication interface 602. The power input port 601 is configured to connect a power line and supply power to the image generation circuit board 200 and the image capture circuit board 400 via the power line. The data communication interface 602 is configured to connect a data line. The digital signal processor 702 receives the above shooting trigger signal via the data line. The communication module 704 outputs a plurality of digital images via the data line, preferably to the superior terminal of the image acquisition apparatus. In this case, the data communication interface 602 includes various types of interface so as to satisfy the data input and output requirements under different conditions.

Considering that the miniature lenses 203 are liable to break, in another implementation, the image acquisition apparatus further includes a lens protection cover. The lens protection cover is configured to protect the various miniature lenses 203 in the miniature lens matrix.

In this case, the lens protection cover is mounted on the outer surface of the front shell 300, covering on the surfaces of the various lens holes 301 for protecting the various miniature lenses 203 and preventing the various miniature lenses 203 from being damaged. The lens protection cover may be made of plastic material.

It should be noted that four miniature lenses 203 are illustrated in FIGS. 1 to 4 in the above as an example for description, but the number of miniature lenses 203 in the figures is not limiting but is merely a schematic example. Likewise, the number of miniature photosensitive elements 201 and image generation circuits 204 is not limited to four. FIGS. 1 to 4 merely illustrate a schematic example but are not limiting.

The image acquisition apparatus in the embodiments of the present disclosure can be placed in a photographing scene and photograph an object to be photographed. In this case, a miniature lens 203 and its corresponding miniature photosensitive element 201 and corresponding image generation circuit 204 constitute a miniature camera. The various miniature cameras and the image capture circuit board 400 constitute a digital camera. In the embodiments of the present disclosure, a plurality of digital cameras constituting an array with parallel rows and columns are processed within the same machine box to form a three-dimensional image capture apparatus.

Before the image acquisition apparatus in the embodiments of the present disclosure shoots images, the apparatus should be calibrated and tested for some specific parameters. Such calibration and testing include focus, distortion and geometric position of the optical axis of the miniature lenses, geometrically positional relationship of the miniature photosensitive elements, interval as measured, and offset in rows and columns, etc. Dedicated calibrating device and software are required for such calibration and testing. After the calibration, the parameters as measured should be offered to three-dimensional processing software. Then relevant measured dimensions should be input into a three-dimensional operation formula for calculating three-dimensional coordinate dimensions. Further, the manufacturing and mounting errors are compensated for by the software, by which the precision of the three-dimensional data is improved. Generally, the above image capture apparatus captures a plurality of two-dimensional images of an object plane in a synchronous way. Once obtaining a shooting signal, the various miniature cameras carry out shooting and obtain a plurality of two-dimensional images in data format. The plurality of two-dimensional images are transmitted to an external image data processing device for processing via the data communication interface 602. The external image data processing device processes the plurality of two-dimensional images to give a three-dimensional image of the photographed object.

In this case, the external image data processing device processes the image data in the form of a two-dimensional image matrix by conducting feature point matching operation for the plurality of images as shot, calculating the spatial position coordinates for the feature points according to the matched feature point image coordinates, calculating other three-dimensional dimensions of the tested object that should be particularly measured according to the obtained spatial position coordinates of the various feature points, forming three-dimensional point could data and establishing a three-dimensional point cloud graph for three-dimensional reconstruction.

It should be noted that in the embodiments of the present disclosure, a miniature lens 203 and its corresponding miniature photosensitive element 201 and corresponding image generation circuit 204 constitute a miniature camera. A matrix formed by four adjacently disposed miniature cameras is an image acquiring unit. In the case where there are only four miniature cameras, there will be one image acquiring unit. In the case where there are more than four miniature cameras, by moving your eyes rightwards or downwards by one miniature camera, a plurality of image acquiring units may be identified by the principle that a miniature camera may be shared. For example, if there are 6 miniature cameras, there will be two image acquiring units, wherein two miniature cameras are shared and appear in both image acquiring units.

In the present embodiment, by the way that a matrix formed by four adjacent miniature cameras is an image acquiring unit, the images acquired by each image acquiring unit are processed to give a three-dimensional image of the photographed object.

The image acquisition apparatus and its corresponding external image data processing device acquire three-dimensional data of an object in the same way as human eyes see the world. That a planar matrix shoots two-dimensional images is like when people view an object from different angles. We can have the three-dimensional overall dimensions of an object by calculating the parallax of the same feature point on different position images through standard procedure operation.

Since currently three-dimensional operation has a huge computation load and independent and small circuits can hardly undertake such vast amount of operation, the only way is to leave the three-dimensional operation to a terminal for superior operation. In the future, as the functions of computing chips become stronger and stronger and the power consumption decreases gradually, we believe it is a sure thing that there will be circuit boards and chips for automatic local three-dimensional data processing.

It should be noted that similar reference signs and letters refer to similar items in the following figures. Therefore, once an item is defined in a figure, it will not be further defined or explained in the following figures.

It is to be noted that in the description of the present disclosure, orientation or positional relations indicated by terms such as "center", "upper", "lower", "left", "right", "vertical", "horizontal", "inner" and "outer" are the orientation or positional relations shown based on the figures, or the conventional orientation or positional relations in the use of the products of the present disclosure, only for facilitating and simplifying description of the present disclosure, rather than indicating or implying that the referred devices or elements must be in a particular orientation or constructed or operated in the particular orientation, and therefore they should not be construed as limiting the present disclosure. In addition, terms like "first", "second" and "third" are merely used for distinctive purpose, but should not be construed as indicating or implying relative importance.

It should also be noted that, in the present disclosure, terms like "provide", "mount", "coupled" and "connected" should be interpreted in a broad sense, unless otherwise explicitly specified and defined. For example, a connection could be fixed, detachable, or integrated, or it could be mechanical or electrical, or it could be direct or done via an intermediate medium, or it could be the internal communication between two elements. Those ordinarily skilled in the art can understand the specific meanings of the above terms in the present disclosure according to specific circumstances.

At last it should be noted that the above embodiments are merely specific implementations of the present disclosure and used to illustrate the technical solutions of the present disclosure, rather than to limit the present disclosure. The scope of protection of the present disclosure is not limited thereto. Although the present disclosure is described in details with reference to the above embodiments, those ordinarily skilled in the art should appreciate that any skilled person familiar with the present technical field may continue to modify the technical solutions described in the above embodiments or readily come up with variations or replace part of the technical features therein with equivalents within the technical scope disclosed by the present disclosure. Such modifications, variations or replacements should not depart the essence of the respective technical solutions from the spirit and scope of the technical solutions described in the embodiments of the present disclosure, and shall be encompassed by the scope of protection of the present disclosure. Therefore, the scope of protection of the present disclosure is subject to that defined by the claims.

The invention claimed is:

1. An image acquisition apparatus based on a miniature camera matrix, comprising an image generation circuit board and a miniature lens matrix, wherein
   the image generation circuit board comprises a image generation circuit matrix, each image generation circuit in the image generation circuit matrix comprises a miniature photosensitive element, and the various miniature photosensitive elements constitute a miniature photosensitive element matrix;
   various miniature lenses in the miniature lens matrix are fixedly provided on the image generation circuit board and correspond to the various miniature photosensitive elements in a one-to-one manner, and axes of the various miniature lenses each are perpendicular to a plane where the image generation circuit board is located,
   wherein the various miniature photosensitive elements in the miniature photosensitive element matrix are formed integrally with the image generation circuit board; or, the various miniature photosensitive elements in the miniature photosensitive element matrix are mounted on the image generation circuit board by welding;
   wherein in processing or welding the various miniature photosensitive elements in the miniature photosensitive element matrix, respective pixel rows in a horizontal direction are required to be aligned with each other and respective pixel columns in a vertical direction are required to be aligned with each other.

2. The apparatus according to claim 1, wherein the apparatus further comprises a lens protection cover, and the lens protection cover is configured to protect the various miniature lenses in the miniature lens matrix.

3. The apparatus according to claim 1, wherein the various miniature lenses of the miniature lens matrix are disposed in an m×n array, wherein m is greater than or equal to 2 and n is greater than or equal to 2.

4. The apparatus according to claim 3, wherein the apparatus further comprises a lens protection cover, and the lens protection cover is configured to protect the various miniature lenses in the miniature lens matrix.

5. The apparatus according to claim 3, wherein the various miniature lenses in a horizontal direction in the miniature lens matrix are disposed at an equal interval, and adjacent two of the miniature lenses have an interval therebetween greater than or equal to 10 mm;
  the various miniature lenses in a vertical direction in the miniature lens matrix are disposed at an equal interval and adjacent two of the miniature lenses have an interval therebetween greater than or equal to 10 mm.

6. The apparatus according to claim 5, wherein the apparatus further comprises a lens protection cover, and the lens protection cover is configured to protect the various miniature lenses in the miniature lens matrix.

7. The apparatus according to claim 1, wherein the apparatus further comprises an image capture circuit board, and the image capture circuit board comprises a digital signal processor and a communication module connected in sequence;
  the image generation circuits are configured to convert analog images generated by the miniature photosensitive elements, into digital images;
  the digital signal processor is configured for systematically controlling the miniature camera matrix, and to fulfill various control functions for image capture, including image capture, image transmission, image gain and shutter control, communication protocol interaction management, timer interruption, task switch, storage management, parameter setting for miniature cameras, capture control and definition of capture format;
  the communication module is configured to output a plurality of the digital images to a superior terminal under control of the digital signal processor.

8. The apparatus according to claim 7, wherein the apparatus further comprises a lens protection cover, and the lens protection cover is configured to protect the various miniature lenses in the miniature lens matrix.

9. The apparatus according to claim 7, wherein the apparatus further comprises a fixing substrate and a front shell;
  the image generation circuit board is fixed on the fixing substrate, and the fixing substrate is mounted at an inner surface of the front shell;
  the front shell is provided therein with a plurality of lens holes which correspond to the various miniature lenses in a one-to-one manner, and the various miniature lenses carry out shooting through the various lens holes.

10. The apparatus according to claim 9, wherein the apparatus further comprises a lens protection cover, and the lens protection cover is configured to protect the various miniature lenses in the miniature lens matrix.

11. The apparatus according to claim 9, wherein the apparatus further comprises a rear shell, and the image capture circuit board is fixedly mounted at a face of the rear shell that faces the front shell.

12. The apparatus according to claim 11, wherein the apparatus further comprises a lens protection cover, and the lens protection cover is configured to protect the various miniature lenses in the miniature lens matrix.

13. The apparatus according to claim 11, wherein the front shell and the rear shell are fixedly connected to form a housing, and the housing is provided therein with a power input port and a data communication interface;
  the power input port is configured to connect a power line, so as to supply power to the image generation circuit board and the image capture circuit board via the power line;
  the data communication interface is configured to connect a data line, and the communication module outputs a plurality of the digital images to a superior terminal via the data line.

14. The apparatus according to claim 13, wherein the apparatus further comprises a lens protection cover, and the lens protection cover is configured to protect the various miniature lenses in the miniature lens matrix.

* * * * *